A. LITVANY.
NON-REFILLABLE BOTTLE.
APPLICATION FILED MAR. 22, 1912.

1,055,340.

Patented Mar. 11, 1913.

WITNESSES:
M. A. Johnson.
W. E. Morton.

INVENTOR
Andrew Litvany,
BY
Wm. H. Caufield.
ATTORNEY

COLUMBIA PLANOGRAPH CO., WASHINGTON, D. C.

UNITED STATES PATENT OFFICE.

ANDREW LITVANY, OF IRVINGTON, NEW JERSEY.

NON-REFILLABLE BOTTLE.

1,055,340.    Specification of Letters Patent.    Patented Mar. 11, 1913.

Application filed March 22, 1912. Serial No. 685,398.

*To all whom it may concern:*

Be it known that I, ANDREW LITVANY, a citizen of the United States, residing at Irvington, in the county of Essex and State of New Jersey, have invented certain new and useful Improvements in Non-Refillable Bottles; and I do hereby declare the following to be a full, clear, and exact description of the invention, such as will enable others skilled in the art to which it appertains to make and use the same, reference being had to the accompanying drawings, and to figures of reference marked thereon, which form a part of this specification.

This invention relates to a non-refillable bottle which is cheaply made and is designed to be easily assembled and to give a free flow of liquid when the bottle is reversed so that the valve in the device is unseated and at the same time shield the valve from tampering or from view from the top portion of the bottle.

The invention is a type which employs a reciprocating valve, the cage surrounding the valve having side passages or recesses, the valve and the cage being so constructed that the valve when open is limited in its movement so that the liquid can pass around the valve through the recesses in the cage and then out through the side openings in a turret which is mounted on the cage and is in communication with the inside of it. The valve-seat on which the valve rests acts as a support for the cage, the cage in turn being held in place by a collar which fits inside of the neck of the bottle, the collar having a chambered portion that receives the turret. The collar and the neck have recesses which come in line when the collar is in place, the collar being inserted with a spring ring in its recess, which spring ring snaps into the recess of the neck and thereby acts as a key to prevent the withdrawal of the collar.

The invention is illustrated in the accompanying drawing, in which—

Figure 1:
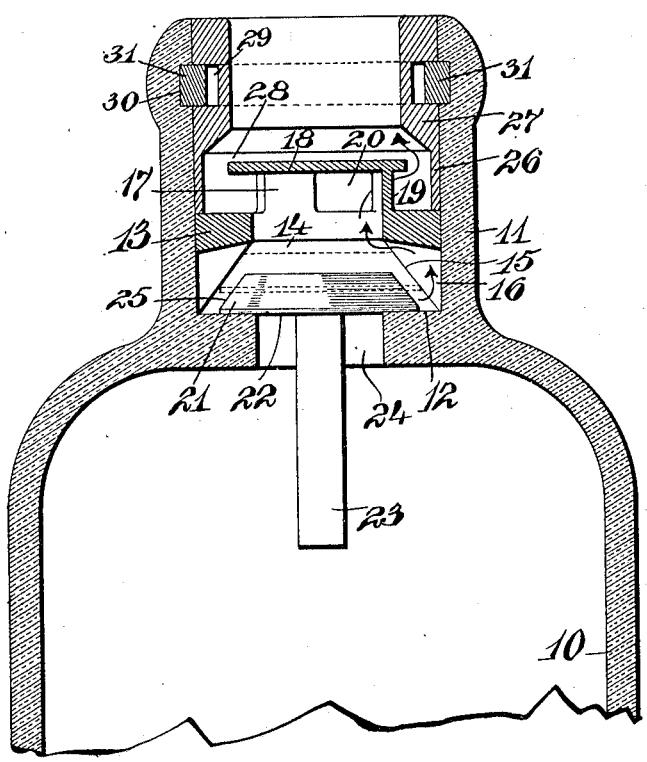
Figure 2:
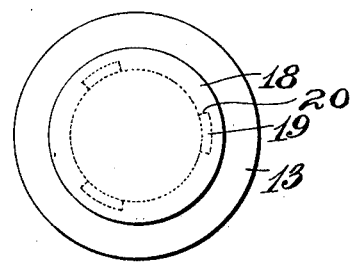
Figure 3:
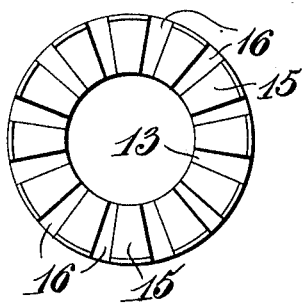

Figure 1 is a vertical section of a portion of the body portion of the bottle and the neck of the bottle with the valve shown in elevation. Fig. 2 is a top view of the cage, and Fig. 3 is a bottom view thereof.

The device is adapted for any form of bottle having a body portion 10 and a neck 11, the inside of the neck being formed with a valve-seat 12 which is preferably at the bottom of the neck, that is, adjacent to the juncture of the neck and the body portion, although it will be evident that this valve-seat can be placed anywhere in the neck. Resting on the collar is a cage 13 which has a chamber 14 on the inside, the chamber having its side walls inclined as at 15 and being provided with recesses 16, these recesses preferably being radially arranged, although they may be given other conformations. On the top of the cage is a turret 17 having a top 18, the side walls 19 of the turret having openings 20 therein. The top of the turret projects over the side walls to make access to the openings therein more difficult. A valve 21 has a flat bottom face 22 resting on the valve-seat 12 when the valve is shut, the valve having a stem 23 extending down through the opening 24 that leads to the body portion of the bottle. The top surface 25 of the valve is inclined, the inclined surface 25 of the valve and the inclined inner wall 15 acting to limit the movement of the valve to the position shown in dotted outline in Fig. 1, the movement of the valve thereby being limited to a distance less than the height of the recesses 16. This permits the passage of liquid through the recesses 16 around the edges of the valve as shown by the arrows in Fig. 1.

The top surface of the cage is engaged by the flange 26 of a collar 27, the collar 27 having a chambered portion 28 to receive the turret 17. The collar is less in diameter than the top of the turret to project over the edge of the top. The collar has a recess 29, and the neck of the bottle has a recess 30, these recesses coming in line when the collar is in place. A spring ring 31, which has a normal tendency to spring outward, is inserted with the collar and snaps outward to the position shown in Fig. 1, so that it fits into the recess 30, the recess 30 being shallower than the thickness of the ring so that the ring is in extension of both recesses and acts as a key.

The cage and the turret can be made of glass if desired, and the same is true of the collar, but I prefer to make the cage and the collar of opaque material, such as porcelain or metal, so as to conceal to a greater extent the valve and its construction.

Having thus described my invention, what I claim is:—

1. A non-refillable bottle comprising a body portion having a neck, the neck forming a valve-seat adjacent to the juncture with the body portion, a cage resting on the valve-seat and forming a chamber on its under side, the side walls of the cage engaging the inside of the neck, the side walls also being recessed part way up from the bottom, the side walls being inclined on the inside, a turret integral with the cage and having a top thereon, the side walls of the turret having openings therein, the turret being smaller in diameter than the cage, the inside of the turret and the chamber of the cage being connected, a collar fitting in the neck of the bottle and having a chamber to receive the turret, the side walls of the chamber forming flanges which engage the top of the cage, means for securing the collar in the neck, and a valve resting normally on the valve-seat, the valve having an inclined top surface to limit the movement of the valve to a distance less than the height of the recesses of the cage.

2. A non-refillable bottle comprising a body portion having a neck, the neck forming a valve-seat adjacent to the juncture with the body portion, a cage resting on the valve-seat and forming a chamber on its under side, the side walls of the cage engaging the inside of the neck, the side walls also being recessed part way up from the bottom, the side walls being inclined on the inside, a turret integral with the cage and having a top thereon, the side walls of the turret having openings therein, the turret being smaller in diameter than the cage, the inside of the turret and the chamber of the cage being connected, the top of the turret extending outward beyond the side walls to prevent easy access to the openings in the turret, a collar fitting in the neck of the bottle and having a chamber to receive the turret, the side walls of the chamber forming flanges which engage the top of the cage, the walls of the collar above the chamber being of smaller diameter than the top of the turret, means for securing the collar in the neck, and a valve resting normally on the valve-seat, the valve having an inclined top surface to limit the movement of the valve to a distance less than the height of the recesses of the cage.

In testimony, that I claim the foregoing, I have hereunto set my hand this 21st day of March, 1912.

ANDREW LITVANY.

Witnesses:
WM. H. CAMFIELD,
M. A. JOHNSON.

---

Copies of this patent may be obtained for five cents each, by addressing the "Commissioner of Patents, Washington, D. C."